(12) United States Patent
Allport

(10) Patent No.: US 6,567,984 B1
(45) Date of Patent: *May 20, 2003

(54) SYSTEM FOR VIEWING MULTIPLE DATA STREAMS SIMULTANEOUSLY

(75) Inventor: David E. Allport, Palo Alto, CA (US)

(73) Assignee: Research Investment Network, Inc., Irvine, CA (US)

( * ) Notice: Subject to any disclaimer, the term of this patent is extended or adjusted under 35 U.S.C. 154(b) by 296 days.

This patent is subject to a terminal disclaimer.

(21) Appl. No.: 09/614,510

(22) Filed: Jul. 11, 2000

Related U.S. Application Data

(63) Continuation of application No. 09/001,841, filed on Dec. 31, 1997, now Pat. No. 6,097,441.

(51) Int. Cl.[7] .......................... H04N 7/173; H04N 5/44
(52) U.S. Cl. .................. 725/110; 725/81; 725/136; 725/141; 455/3.06; 348/734; 348/552
(58) Field of Search ................................. 725/131, 141, 725/139, 110, 151, 113, 119, 109, 78, 82, 85, 80; 348/552, 725, 553, 734; 455/3.06

(56) References Cited

U.S. PATENT DOCUMENTS

| | | | |
|---|---|---|---|
| 4,712,105 A | 12/1987 | Kohler | 340/825.69 |
| 4,746,919 A | 5/1988 | Reitmeyer | 340/825.56 |
| 4,856,081 A | 8/1989 | Smith | 455/151 |
| 4,872,151 A | 10/1989 | Smith | 369/14 |

(List continued on next page.)

FOREIGN PATENT DOCUMENTS

| | | | | |
|---|---|---|---|---|
| JP | 55-140371 | * | 11/1980 | 358/194.1 |

OTHER PUBLICATIONS

Scottdale Technologies, Inc.'s Users' Manual to Program Master Product, © 1996, 1997.

Rotel of America's User's Manual to Rotel R990 Product (approximately Oct., 1997).

Page from product brochure of Marantz RC2000 Product (approximately Aug. 1996).

Lexicon, Inc's product brochure for Lexicon 500T Product, © 1994.

Niles Audio Corporation, Inc.'s product brochure for Intellicontrol product, Aug. 1996.

Full House Control Corporation, The RHOC, © 1997 (pages from website: www.fullhouse.com/rhoc.html), Apr. 29, 1998.

Full House Control Corporation, The RF Base Station, © 1997 (pages from website: www.fullhouse.com/base.html), Apr. 29, 1998.

Full House Control Corporation, RHOC for Windows, © 1997 (pages from website: www.fullhouse.com/rhocwin.html), Apr. 29, 1998.

KC–Z1 Stage 3 Home Theater Controller, Kenwood U.S.A. (pages from website: www.kewoodusa.com/cat...Stage_3_Components/KC–Z1.htm), Apr. 28, 1998.

Sony's Product Promotion Flyer for CDP–CX270 Product (approximately Jun., 1997).

(List continued on next page.)

*Primary Examiner*—Victor R. Kostak
(74) *Attorney, Agent, or Firm*—Kevin Masaki; Steven Wong; Caroline T. Do

(57) ABSTRACT

Systems and methods of viewing multiple data streams are disclosed. A base station receives a first data stream and a second data stream. The first data stream is transmitted to a first device. The first device is capable of displaying motion video. The first data stream is displayed on the first device. The second data stream is transmitted to a second device. The second device Is capable of displaying motion video. The second data stream is displayed on the second device.

21 Claims, 3 Drawing Sheets

U.S. PATENT DOCUMENTS

| | | | |
|---|---|---|---|
| 4,894,789 A * | 1/1990 | Yee | 348/552 |
| 5,031,046 A | 7/1991 | Bruggemann | 358/194.1 |
| 5,075,771 A | 12/1991 | Hashimoto | 358/84 |
| 5,086,385 A | 2/1992 | Launey et al. | 364/188 |
| 5,093,718 A | 3/1992 | Hoarty et al. | 358/84 |
| 5,138,649 A * | 8/1992 | Krisbergh | 379/56 |
| 5,223,924 A | 6/1993 | Strubbe | 358/86 |
| 5,228,077 A | 7/1993 | Darbee | 379/102 |
| 5,251,034 A | 10/1993 | Na | 358/183 |
| 5,262,860 A * | 11/1993 | Fitzpatrick et al. | 358/142 |
| 5,307,055 A * | 4/1994 | Baskin et al. | 348/734 |
| 5,315,391 A | 5/1994 | Lee | 348/553 |
| 5,343,239 A * | 8/1994 | Lappington | 348/12 |
| 5,379,421 A | 1/1995 | Palazzi, III et al. | 395/600 |
| 5,396,546 A * | 3/1995 | Remillard | 379/96 |
| 5,410,326 A | 4/1995 | Goldstein | 348/134 |
| 5,422,677 A | 6/1995 | Do | 348/568 |
| 5,455,570 A | 10/1995 | Cook et al. | 340/825.22 |
| 5,465,385 A | 11/1995 | Ohga et al. | 455/6.1 |
| 5,481,542 A | 1/1996 | Logston et al. | 370/94.2 |
| 5,497,186 A * | 3/1996 | Kawasaki | 348/6 |
| 5,499,046 A * | 3/1996 | Schiller | 348/6 |
| 5,500,691 A | 3/1996 | Martin et al. | 348/734 |
| 5,500,794 A | 3/1996 | Fujita et al. | 364/188 |
| 5,515,347 A | 5/1996 | Mulder et al. | 369/30 |
| 5,543,857 A | 8/1996 | Wehmeyer et al. | 348/589 |
| 5,545,857 A | 8/1996 | Lee et al. | 178/18 |
| 5,557,338 A | 9/1996 | Maze et al. | 348/565 |
| 5,561,708 A | 10/1996 | Remillard | 379/96 |
| 5,574,964 A * | 11/1996 | Hamlin | 455/3.1 |
| 5,585,866 A | 12/1996 | Miller et al. | 348/731 |
| 5,589,892 A | 12/1996 | Knee et al. | 348/731 |
| 5,594,509 A | 1/1997 | Florin et al. | 348/731 |
| 5,600,368 A | 2/1997 | Mathews, III | 348/143 |
| 5,602,597 A * | 2/1997 | Bertram | 348/565 |
| 5,608,446 A * | 3/1997 | Carr et al. | 348/6 |
| 5,621,456 A | 4/1997 | Florin et al. | 348/7 |
| 5,630,757 A | 5/1997 | Gagin et al. | 463/43 |
| 5,648,824 A | 7/1997 | Dunn et al. | 348/734 |
| 5,657,072 A | 8/1997 | Aristides et al. | 348/13 |
| 5,671,267 A * | 9/1997 | August et al. | 379/61 |
| 5,689,663 A | 11/1997 | Williams | 395/327 |
| 5,694,163 A * | 12/1997 | Harrison | 348/468 |
| 5,708,961 A * | 1/1998 | Hylton | 455/4.2 |
| 5,715,020 A * | 2/1998 | Kuroiwa et al. | 348/734 |
| 5,722,041 A * | 2/1998 | Freadman | 455/6.3 |
| 5,761,606 A * | 6/1998 | Wolzien | 455/6.2 |
| 5,781,228 A * | 7/1998 | Sposato | 348/13 |
| 5,828,403 A * | 10/1998 | DeRodeff et al. | 348/7 |
| 5,886,732 A * | 3/1999 | Humpleman | 348/10 |
| 6,286,142 B1 * | 9/2001 | Ehreth | 725/78 |
| 6,340,987 B1 * | 1/2002 | Hayashi | 348/13 |

OTHER PUBLICATIONS

Audio Advisor Magazine, Nov. 1997, p. 24.

Stereo Review Magazine, Sep. 1997, pp. 83–85.

Innovation Device Technologies, Inc. Executive Investment Summary (pages from website: www.innovative-device.com/execsum.htm), Apr. 29, 1998.

Blue Mountain with Jblend, Aplix Corporation (pages from website: www.jBlend.com/products/bm.html), Apr. 29, 1998.

WebTV Backgrounder, WebTV Networks (pages from website: www.webtv.net/ns/about/backgrounder.html), May 4, 1998.

English translation of Reference N (which was cited by the Examiner on Form PTO–892 in the Office Action dated Apr. 5, 1999 in parent application 09/001,841), Japanese Open Patent Bulletin entitled "Television Receiving System".

* cited by examiner

SYSTEM FOR VIEWING MULTIPLE DATA STREAMS SIMULTANEOUSLY

RELATED APPLICATIONS

This application is a continuation of U.S. patent application Ser. No. 09/001,841, filed Dec. 31, 1997, U.S. Pat. No. 6,097,441 to which priority is hereby expressly claimed. This application contains subject matter related to co-pending U.S. patent application Ser. No. 09/001,873, entitled "Portable Internet-Enabled Controller and Information Browser For Consumer Devices," filed Dec. 31, 1997, invented by the same inventor as the present invention, and assigned to the same assignee as the present invention. The entire original disclosures of the above-referenced co-pending applications are hereby expressly incorporated herein by reference.

TERMINOLOGY

As used in this application, the term "data stream" refers generally to transmitted information, and a data stream may itself contain multiple data streams. A data stream may be HTML data transmitted from the Internet, or it may be a "media stream" such as an analog or digital TV broadcast signal, satellite TV signal, cable TV signal, or other audio and/or video signal. Media streams such as TV broadcast signals may contain several channels, and each channel may further contain audio, video, or other embedded data streams, including HTML data. Furthermore, HTML data is used to refer to any Internet-derived data, as opposed to solely data that is in the HTML protocol format, as the concepts described herein are equally applicable to other Internet-derived data, especially data that is transmitted in a widely accepted protocol.

FIELD OF THE INVENTION

The present invention relates generally to systems and methods for using two or more cooperating but physically independent displays for enhanced viewing of data streams on each display, wherein the viewing of a data stream on one display does not interfere with the viewing of a data stream on the other displays. More particularly, the images may be derived from complex data streams such as multiple TV (television) broadcast signals (and/or cable TV or satellite transmissions or other video signals), Internet data, and/or other local data such as information related to the state of a consumer's home appliances. In addition, the different displays may be available for viewing by more than one person.

BACKGROUND OF THE INVENTION

As technology rapidly advances, there are more and more sources and types of information available to a consumer. For example, after TVs improved from simple black-and-white TVs to color TVs, cable and satellite TV became available. Most recently, Internet-enabled TV became available to provide both TV and Internet content. In a fast-paced society such as ours, consumers are looking for ways to enhance the overall viewing experience and to absorb more of the available information from various sources, in less time.

One of the simplest methods of obtaining more information is to use multiple independent displays, such as a having two TVs tuned to two separate channels, or two closed circuit cameras (e.g., security cameras) focused on separate areas. The problem with this method is that the person viewing the information may have to use various non-cooperating controllers for controlling the different devices, and may even have to physically change locations after viewing one display in order to be able to view another display. Additionally, this type of method usually involves fixed displays, as opposed to at least one portable display. And though it is possible to use a single universal remote control to control both TVs, additional problems exist including the cost of multiple TVs or monitors, the physical space required for the TVs, and the availability of other electronics hardware such as cable receivers, closed circuit wiring, etc.

Other multiple-display systems have displays in close physical proximity to each other and may display related data, but if integration of the data is to occur, it must be accomplished manually, as the underlying systems are not capable of doing so. That is because the physical display devices are each dedicated to providing a limited amount of information related to a limited topic of interest. Examples of these types of systems include radar screens and controls in a cockpit of an airplane, and medical instruments monitoring various vital signs of a patient in a hospital.

One method of enhancing the viewing experience involves using multiple displays to simultaneously display multiple duplicate data streams. This is common in electronics stores where many TVs are all tuned to the same channel, or in exercise classes where many TVs are all playing the same exercise video tape. Though perception of the data stream (i.e., TV program or video tape) might be enhanced in such a case, the viewer is only viewing multiple copies of the same data stream, and is not benefited with access to data streams of differing content.

Other multiple-display systems display separate parts of a single image, and the displays taken as a whole are designed to represent the desired image. The displays are arranged in a predetermined pattern such as side-by-side, in a matrix, or even to form a cylindrical "circle vision" theater. Again, though the viewing experience is altered and perhaps enhanced, the viewer is only viewing what is designed to be a single image from multiple data streams. In fact, these systems may even detract from the desired image perception due to the gaps between the several display screens and/or the imperfect placement of the various parts of the overall image within the various display screens.

Another attempt to provide consumers with a method of viewing multiple data streams simultaneously to obtain more information, is through the use of windows-type operating systems used with PCs. The user may swap between multiple windows to view various data streams. However, these systems are designed under the assumption that the viewer concentrates on a single type of application at a time. Thus, the same physical display is used for the multiple windows that represent various applications. A particular window may be enlarged to cover the entire display, but then the benefit is lost of having the capability to view multiple data streams substantially simultaneously. Furthermore, the individual applications are typically independent of each other, and do not communicate with each other except for perhaps during data transfer. Even where multiple windows are viewed simultaneously, such as during video conferencing where a person may view multiple conference "attendees" in various windows, the images of the attendees all appear on the same physical display, and the more attendees there are, the less room there is for each to be displayed.

Various systems also exist that attempt to solve the problem of viewing multiple data streams substantially simultaneously with two or more cooperating displays. A common system is a PIP (picture-in-picture) system, which allows simultaneous viewing of two TV programs at once, for example. Though the viewer may "channel surf" a first data stream without affecting the overall image produced by the second data stream, both data streams are displayed on the same physical display, and therefore there is some degradation of the viewing experience of each. For example, a primary program may be playing on the entire physical TV display while a secondary program (the PIP) is playing in a small area in the corner of the display. The primary program is degraded due to the screen real estate used up by the secondary program, and the secondary program is degraded because it is not able to occupy the full size of the physical display.

Similarly, existing TV interfaces provide a wide variety of available functions such as data display (e.g., to adjust attributes of the TV and related devices), advertisements, Internet browsing, alternate channel viewing, etc. But the additional functions are all managed by assigning different amounts of the same physical screen to the additional function or functions. This approach of sharing the same physical screen real estate for all operations performed by a device means that combined activities restrict the display potential of each other, unless each activity occurs serially, which would defeat the entire purpose of allowing simultaneous viewing of multiple data streams in the first place. Moreover, the resolution of standard TV display formats such as NTSC (the American standard) and PAL (the British standard) are not very suitable for displaying static text.

Another type of system that involves data integration to some extent is a computer network, or even simply a remote PC communicating with a host. Software synchronizes the data files stored on each device, and files can then be downloaded from the host to the remote PC, edited remotely on the PC, and then transferred back to the host. However, this setup is designed primarily for one or the other device to be used independently. The simultaneous use of both devices occurs only during file transfer, or in some cases to achieve the same type of extended screen real estate for a single-image display that occurs with two or more displays side-by-side.

Thus it would be desirable to provide systems and methods for using two or more cooperating but physically independent displays for achieving enhanced viewing and/or browsing of data on each display, without affecting the viewing and/or browsing of data on the other displays.

SUMMARY OF THE INVENTION

The present invention is based upon the recognition that there are many situations in which users wish to view or otherwise perceive more than one data stream substantially simultaneously, without having the experience of any data stream degraded by the others. A hand-held, portable remote control with an integrated video display capable of displaying full motion video is thus disclosed, in combination with hardware and/or software that enables interaction between the TV or other primary display screen and the hand-held display. The hardware may include an integrated TV tuner and/or various data communication ports, or a physically separate base station with a TV tuner and/or various data communication ports. In the latter case, the base station and the remote control would communicate preferably via RF (radio frequency).

Many applications exist where the user or users may derive a great benefit from an additional display screen for user interaction, as will be discussed herein. One such situation is for users of TV systems that display text-based status information on the TV display during attribute adjustment (e.g., to volume, contrast, color, tint, brightness, sound, etc.), or for closed caption messages such as sports scores, stock quotes, etc. The remote control display may be used to display that information and therefore leave the primary viewing screen free of unnecessary clutter. For existing Internet-enabled TV the benefit realized is even greater due to the significant amount of screen real estate typically devoted to displaying navigational and other information. By adding a second display that communicates with the TV, all of the navigational interface can be removed from the TV screen, leaving much more room for actual viewing content.

Video games (both single user and multi-user) are another application where the users may realize a benefit from an additional display. Many computer games exist that allow multiple players in different locations to play with (or against) each other. These often take the form of interaction in on-line "virtual worlds." In order to play these games effectively, a user must be aware of the general topology of the virtual world, as well as where he or she is in the world in relation to others. The interface to the virtual world may be presented in various perspectives, and from various distances. In any case, the user's sense of where he or she is in the world can be greatly enhanced by the provision of an additional view.

Similar advantages apply to other types of virtual world interactions, such as three-dimensional multi-user chat rooms, where the present invention would enable simultaneous first-person and alternative more global views from selected vantage points. This will greatly assist the navigation through the virtual world, and also increase the perceived immersion in the world by avoiding constant context-switching on a single screen.

Another application of the present invention finds use in working with Internet-enabled TV. Several companies are working on (or are marketing) technology that integrates TV and Internet content within the same signal. For analog signals such as TV broadcasts, Internet data is embedded within the VBI (vertical blanking interval). Examples of this are Intel's "Intercast" standard (which some TV networks are already using), and Navio's HTML-TV standard. Likewise, Thomson Sun Interactive has been using an "Open TV" standard in Europe, in which the technology for both broadcasting and receiving signals with data embedded using the Open TV standard has been implemented. Another company, Starsight, markets hardware and software capable of receiving and decoding signals with embedded data, where the hardware and software is for use with third party units. Data may also be embedded in digital signals using the MPEG standard. The embedded data typically may be displayed as text and graphics independently of the image displayed from the normal video signal.

The present invention would allow both the regular signal, and the embedded data, to be viewed simultaneously on different displays—something that is not possible using the technology provided by the aforementioned systems. This not only provides clearer viewing of both data streams due to elimination of screen clutter, but also allows "semi-synchronous" interactions with the TV and Internet data, as described herein.

The present invention is especially useful in family or group situations where multiple people are viewing the same TV screen simultaneously. One person could channel surf actual TV content on the hand-held remote control, while the other viewers enjoy the TV program on the primary display (e.g., the TV screen). This effectively turns a legacy TV into a TV with PIP capability, with the added benefit that the PIP is actually on a separate display. Using suitable communications infrastructure, which is described in more detail herein, the remote control's display may also function as a regular portable TV.

Additional uses of the present invention may be for video-conferencing, wherein each of many displays may be used to show one attendee of the conference, or for controlling other various consumer devices and appliances such as those that respond to IR (infrared) commands, as disclosed in previously-referenced co-pending application Ser. No. 09/001,873. The full motion video capability of the remote control allows the user to view the output from security cameras, a video baby monitor, etc., or to use the remote control and its display to form part of a video phone system (with the addition of microphones), all without interrupting the primary display screen such as the TV display. And in an embodiment where the remote control has enough memory or access to an outside storage device, the remote control may also function as a convenient front-end to DVD (digital versatile disk) players and recorders, allowing the user to browse actual video, audio, and other recordings to select a desired title for playing.

Accordingly, it is an object of the present invention to provide improved systems and methods for providing an enhanced overall viewing experience of multiple data streams.

It is a further object to provide improved systems and methods for allowing substantially simultaneous viewing of multiple data streams.

It is a further object to allow substantially simultaneous viewing of multiple data streams using two or more cooperating but physically independent displays.

It is a further object to provide a hand-held remote control with an integrated video display for providing the means by which one of the data streams is viewed.

Other objects and advantages of the present invention will become apparent from the detailed description of preferred embodiments which follow, when read in conjunction with the drawings.

DETAILED DESCRIPTION

The present invention will be described as a "dual display" system, but it is to be understood that the concepts described herein are equally applicable to a "multiple display" system having three or more cooperating displays. Of course, implementation of the latter system would require more hardware and software for managing the communications between the various displays.

Figure 1:
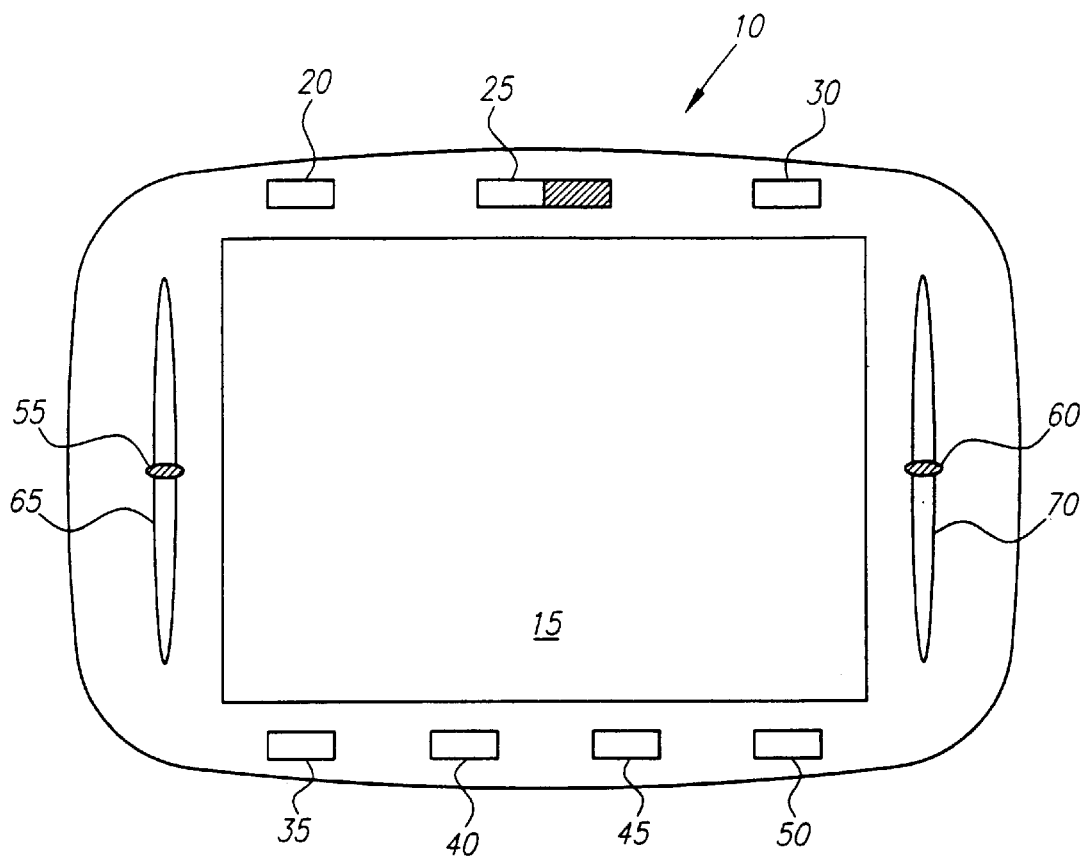
FIG. 1 shows a preferred embodiment of the remote control of the present invention with a variety of physical actuating buttons, and a blank display.

Before describing the operation of the system and methods of the present invention, it will be helpful to describe the physical appearance of a preferred embodiment of a remote control 10 that forms part of the system. Turning to FIG. 1, the drawing is not to scale, but preferably the remote control 10 is a hand-held size on the order of only several inches long by several inches wide by a few inches deep, such that it may be carried comfortably in one hand or in a shirt pocket.

The display area 15 is surrounded by various physical actuating buttons 20, 25, 30, 35, 40, 45, 50, 55, and 60. There may be, for example, up to twenty physical buttons, or less than twenty, and more preferably less than fifteen, and more preferably less than twelve, and still more preferably ten or less. The display area 15 preferably comprises an LCD and is preferably 320 pixels by 240 pixels (¼ VGA). It may have higher resolution (i.e., greater than 320 pixels and/or greater than 240 pixels) or lower resolution, but preferably not lower. It may be monochrome or color, and is preferably touch sensitive. It must be capable of displaying full motion video, such as the images produced by broadcast TV signals.

The physical actuating buttons may include push buttons (e.g., 20, 30, 35, 40, 45, and s 50), switches (e.g., 25), sliders (e.g., 55 and 60 which slide in slots 65 and 70 respectively), or other mechanisms not shown such as touch-sensitive pads, levers, toggles, dials, knobs, pull buttons, track balls, a mouse, etc. The functions of the buttons may vary, and some may have fixed functions while others may be programmable. Common functions may include a power on/off, a help button, and a mode-switching button wherein the remote control 10 is switched from a viewing mode to a control mode. The display 15 may also have some programmable buttons (also known as "soft keys)" in certain modes of operation. A more detailed explanation of the possible operation and function of the buttons is set forth in previously-referenced co-pending U.S. patent application Ser. No. 09/001,873. In addition, further uses may be made of the video capability of the remote control 10 here, such as by using video clips during configuration and/or during "help" mode.

The remote control 10 is used in combination with hardware and/or software to form a system that enables interaction between the TV or other primary display, and the display 15 of the remote control 10. The applications of the system as previously discussed are described here in slightly more detail, and a description of the hardware and/or software that enables the system to be used as herein described will follow.

For the situation where an Internet-enabled TV display is cluttered with text-based and other navigational information, a further benefit of the present invention is that with suitable HTML (Hypertext Markup Language) parsing software 10, some parts of the actual Internet content could also be displayed on the remote control's display 15. This frees up even more of the primary display for actual content. For example, many web sites employ "frames" with their own navigational aides in the form of graphical icons, indexes to sub-pages, etc. These could be displayed on the hand-held remote control, again leaving more room for the image created by the primary data stream to be shown on the TV screen. Some of the buttons on the remote control 10 in this context could be used for bookmarking web sites, context switching (e.g., from browsing the web to watching a TV program), Internet navigation, etc.

Moreover, for both Internet-enabled TV and regular TV, an additional benefit to be realized is that the resolution of the text-based information on the remote control display 15 could be much greater than that on the TV displays because the remote control display 15 may have an LCD (liquid crystal display) as opposed to a CRT display, and therefore may employ VGA, SVGA or better technology as opposed to NTSC or PAL. The function of one of the buttons on the remote control 10 in this application may be to swap the images shown on the displays. Other functions for which sliders 55 and 60 are particularly suited could be used to change channels on the TV and on the remote control's display 15 respectively.

During virtual world communications, such as in virtual world games (single or multiple user), the benefit of the present invention is that the interface to the virtual world may be presented in various formats on the two separate displays. The player is thus provided with more strategic information. Various perspectives could be a first person view, wherein the virtual camera takes the viewpoint of a character in the world that is being played by the user; a second person view, wherein the virtual camera takes the viewpoint of a character in the world that is being played by a different user; or a third person view, wherein the virtual camera takes the viewpoint of no particular character, but instead has a global view of the world, usually focussing on the character being played by the user. The two simultaneous views may be from different perspectives, or they may be from the same perspective, with one view displaying a close-up while the other displays a "bird's eye" view, or any other combination. Here too, the function of one of the buttons on the remote control 10 may be to swap the images shown on the displays. Or one function may be to enlarge or reduce a particular display, or to cycle through the available displays so that a player may perceive the world as one of his or her "enemies" or "allies" is perceiving the world. Other functions may be for other game controls, which may also be performed via an IR keyboard or other input means.

When using the present invention with Internet-enabled TV, an additional perceived benefit is in the use of "semi-synchronous" interaction with TV ads. TV ads on Internet-enabled TV typically provide addresses or links to web sites, where a viewer could obtain more detailed information and review the information at their own pace. With the present invention, a viewer could use the remote control 10 to bookmark web sites from advertisements as they occur or soon thereafter, and then later use the remote control 10 to contact the web sites for further information. The viewer could even do so during the time when regular programming (non-ads) returned to the TV, and browse the Internet sites on the remote control's display 15 without affecting or interfering with the primary TV display. Furthermore, existing Internet-enabled TV systems typically require the use of navigational input means (such as a mouse or IR keyboard) to access specified functions or to enable Internet links appearing on the display. With the present invention, the same type of navigational aides could be used for accessing information on the remote control's display 15. However, it is possible, and desirable, for such access to be accomplished directly through the use of buttons, thus preventing the need for excess input and navigation.

The present invention also provides a benefit for the situation where additional data (e.g., HTML data) is embedded in the VBI of the TV signal, or in dedicated slots within a digital signal. That data could be stripped from the signal and viewed on the remote control's display 15 while the regular video signal appeared on the primary display. This differs from how current Internet-enabled TVs make use of VBI data, because they all operate under the presumption that only one display is available for both the regular video signal and the VBI data. Some of the buttons on the remote control 10 in this context could be used for changing font sizes of any text data, scrolling through text, or swapping the programs showed on the two displays.

An especially useful application of the present invention is in the context of family or group TV viewing is the ability to channel surf. This may also be useful for a single viewer. A viewer may channel surf for alternate programs of interest, without interfering with the program then playing on the TV. The advantages of being able to see alternative channel program listings on a hand-held display separate from the main viewing screen are described in the previously referenced co-pending application Ser. No. 09/001,873. The present invention also enables the user to actually select the channel, and view the alternate program on the remote control's display 15. Headphones may be used to receive the audio portion of the alternate channels being surfed. After finding a desired alternative, a user may execute a command (by the press of a button for example) to cause the primary viewing screen to display the desired program that was found while surfing. In addition, a button may allow the user to execute a "swap" such that not only does the primary display switch to show the desired program that was found while surfing, but the hand-held display 15 switches to show the program that was being played on the primary display as well.

Turning now to the hardware and/or software of the present invention, it is to be understood that the drawings are of preferred embodiments only, and that other configurations may be designed without varying from the spirit and scope of the inventive concepts described herein.

The software may be written in any convenient programming language or languages, and preferably comprises an underlying system control component and an application interface component. The system component controls the execution of the actual commands necessary to control the consumer devices. It controls the storage, access, and other data management tasks necessary for proper functioning. It also retains an internal representation of each device being controlled, its type (CD player, TV, etc.), name, and associated icon if applicable. The system component also maintains a table of IR commands for each device, along with associated data such as the representation of the commands on the remote control's display, if applicable. The application interface component acts as a front-end for the consumer to program and otherwise make use of the system component, and is implemented such that a control algorithm allows the consumer to navigate through the available screens to accomplish the desired control over consumer devices.

The software is preferably programmable by the user and presents a unified system view of various devices being controlled. For example, there may be volume and channel controls on one screen which control the volume of a stereo speaker connected to a TV output and the channel on a cable box connected to the TV input respectively. The ease of this system contrasts with that of known universal remote controls where it is necessary to first select a "stereo" mode, then change volume, then select "cable" mode to change channel.

The programming may be accomplished with an integrated graphical keyboard for simple tasks such as entering and modifying passwords, or for more complex programming, but the latter is preferably done with the use of companion software either using an IR keyboard or other input means in conjunction with the display 15, or by using PC software on a PC. For example, the functions to be performed by certain buttons may be programmed by companion software, and the display may then show the association of physical or touch screen actuating buttons with the actual functions they perform. Passwords and filters may be programmed to assist parental control or other monitoring, and screen layouts may also be designed. For a more detailed description of associated software, the previously mentioned co-pending U.S. patent application Ser. No. 09/001,873 may be consulted.

Figure 2:
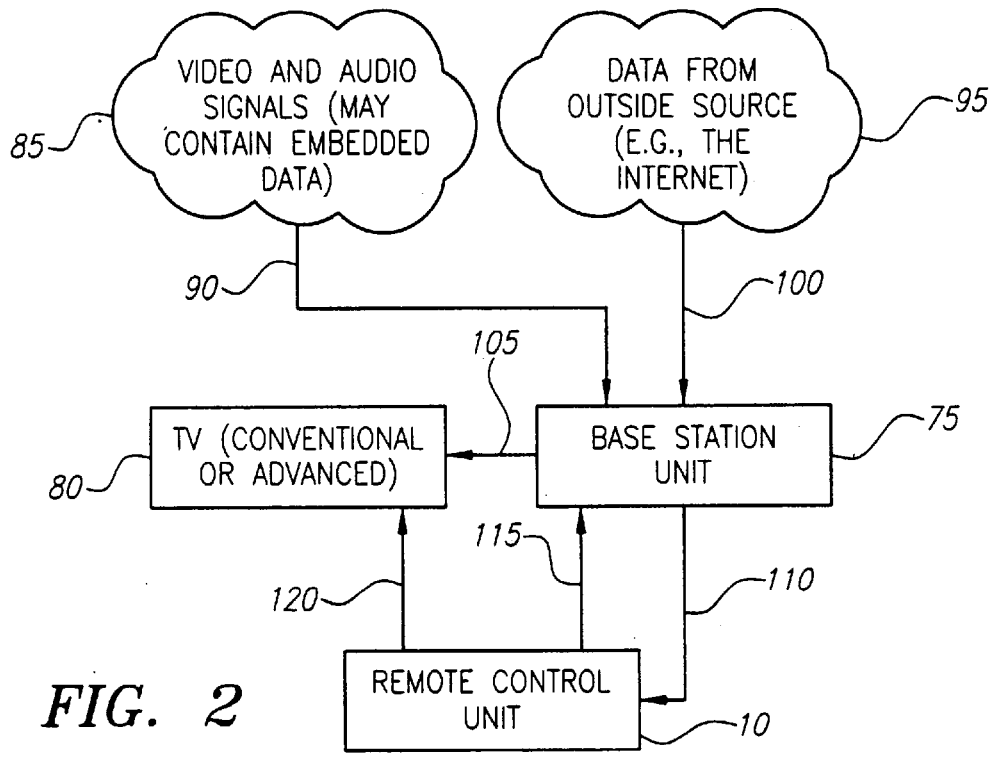
FIG. 2 is a system diagram of a preferred embodiment of the present invention, showing the channels of communication between the various system components.

Turning now to the hardware, FIG. 2 shows a system diagram of how components of the present invention cooperate with existing technology to implement the concepts described herein. The hardware for the base station 75 will be described in more detail in conjunction with the description of FIG. 3, and the hardware for the remote control 10 will be described in more is detail in conjunction with a description of FIG. 4.

FIG. 2 shows the base station 75 as a physically separate component from the remote control 10, which is a preferred embodiment, but the base station 75 may be implemented as an integrated part of the remote control 10 or of the TV 80 if desired. In fact, some existing ATVs (advanced TVs) are equipped with a two-way Internet connection, a decoder for separating out embedded data from analog or digital signals, and hardware and software to send complex data streams including video signals. For users with ATVs such as this, the remote control 10 needs only to have the capability of receiving and displaying complex data streams, and needs no additional communication ports other than a control IR port for sending IR commands. In such an embodiment, the elimination of additional communication ports and/or a decoder may have a significant effect on the cost of the remote control 10.

Other advantages of having a base station 75 separate from the remote control 10 (i.e., either physically independent or integrated in the TV 80) are that the remote control 10 may be lighter in weight and smaller in size. And most significant, the remote control 10 could operate in a wireless mode, with the base station 75 having any needed wired connections to the home cable box, satellite TV receiver, VCR, etc. Size, weight, and the ability to operate in a wireless mode are critical features in providing an overall enhanced viewing experience.

Still referring to FIG. 2, various signals (data streams) 85 from various sources enter the base station 75 as indicated by arrow 90. The signals 85 may originate from broadcast TV, cable TV, satellite TV, a VCR, a laser disc, a DVD, or any other source, they may be analog or digital, and they may contain embedded data as previously described. Other data 95 from an outside data source such as the Internet may enter the base station 75 as indicated by arrow 100. In practice, it is preferable, as indicated by FIG. 2, that all data streams enter the base station 75, which may then act as a switching station for the data streams by determining whether to send the data streams (or parts thereof) to the TV 80, to the remote control 10, to both, or to neither. This would be extra beneficial, for example, if the TV 80 had only one input, because instead of having to physically switch cables to change from one input to another, the switching could be accomplished within the base station 75 and the base station 75 could send the proper input signal to the TV 80. However, it is technically feasible to have incoming signals sent both to the base station 75 and to the TV 80.

Data streams pass from the base station 75 to the TV 80 by wired connections as indicated by arrow 105. There may be only one connection, or there may be many. A typical connection may include a standard TV cable which passes all or part of data streams 85 to the TV 80. Other connection means (such as RS232, USB, and/or modem ports or other digital I/O ports for DVD media, etc.) may exist in the TV 80 for passing all or part of data streams 95 to the TV. The latter connections would apply, for example, to ATVs with Internet capability. Data streams pass from the base station 75 to the remote control 10 by wired or wireless communications, indicated by arrow 110. Wired communications may employ either USB or Firewire 1394 protocols, both of which are capable of transmitting full motion video. However, wired communications are not preferred, as they detract from the overall viewing experience by inhibiting the user's mobility.

For wireless communications, the base station 75 may transmit data to the remote control 10 by way of fast IrDA or RF, but the preferred method is RF, in which case the frequency of transmission would be preferably at 900 MHz, 2.4 GHz, or other FCC-approved home communications frequencies. The main reason RF is preferred is that an important aspect of the present invention is the ability to view video on the remote control's display 15. For the base station 75 to efficiently and accurately send video signals at an acceptable rate of speed, IR is not as well-suited as RF. IR transmissions have limited range capabilities, and are useful typically only for sending small amounts of data, not the large amounts of data in a video signal. Even "fast IrDA" technology, which is capable of transmitting video signals, can operate effectively only within about one meter at most. Furthermore, IR signals will not operate through walls, whereas RF signals will, thus with RF communications a user may operate the remote control 10 from a room physically separate from the room where the base station 75 is located.

Communications from the remote control 10 to the TV 80 (as indicated by arrow 120) are preferably by standard control IR. Typical communications from the remote control 10 to the TV 80 may be to adjust TV attributes such as volume, channel, input, etc. The remote control 10 may also send commands to other devices, such as a DVD player, VCR, etc., for the control thereof.

Communications from the remote control 10 to the base station 75 (as indicated by arrow 115) are also preferably by standard control IR, though RF communications to the base station 75 could be an option because some of the hardware would already be present due to the need for the base station 75 to transmit by RF to the remote control 10, as previously described. Typical commands from the remote control 10 to the base station 75 may be a request for a new channel to view on the display 15 (i.e., channel surfing), a request to swap displayed programs with the TV 80, a request to access new data from the Internet or other outside data source, or any other request to the base station 75 for data streams.

The type of request from the remote control 10 to the base station 75 will vary greatly depending on the application in progress. For example, during a video game, a request may be to provide another view of the virtual world topology. The base station 75 may satisfy that type of request by retrieving the data 95 from an outside source such as the Internet, or alternatively the base station 75 may do processing internally to provide the other view. Other types of requests may be to access a new web site while browsing the Internet, in which case the base station 75 would access the data 95 and transmit it to the remote control 10.

An extremely useful feature is to have the data streams on the TV's display and on the remote control's display 15 swapped. In order for this to occur, the base station 75 that is providing a channel to the remote control 10 must tune to a new channel (the one the TV is tuned to just prior to the swap), and the TV must tune to a new channel (the one the base station is tuned to just prior to the swap). Therefore, there needs to be a way for the system (e.g., as seen in FIG. 2) to know what channel the TV 80 is tuned to just prior to the swap, and what channel the base station 75 is tuned to just prior to the swap. A preferred method, though by no means the only method, is for both the base station 75 and the TV 80 to get the required information from the remote control 10. This will usually be possible because the remote control 10 is aware (i.e., may store in its memory) of the channel the TV is tuned to based on the fact that the remote control 10 will have sent the "change channel" IR command to the TV 80 in the first place. Similarly, the remote control 10 will be aware of the channel the base station 75 is tuned to based on the fact that the remote control 10 will have sent the "change channel" IR command to the base station 75 in the first place too. Thus, the remote control 10 may be programmed to send IR control commands to both the TV 80 and to the base station 75 with the push of a single button.

So if the user wants to swap the programs being displayed on the TV 80 and the remote control's display 15, a single button on the remote control may be programmed to execute the swap. An example of the sequence of commands sent by actuating the swap button is as follows. First, a command is sent from the remote control 10 to the base station 75 to tune the bass station's tuner to the channel at which the TV 80 is tuned. As previously stated, the remote control 10 already knows the channel. That would complete the first half of the swap, as the program then being displayed on the TV 80 would be displayed on the remote control's display 15 due to the base station 75 tuning to the proper channel. Note that the remote control 10 knows the channel that the base station 75 was tuned to just prior to the swap as previously stated, and would have stored that information in its memory for subsequent use to complete the swap. That information Is needed because next, a command is sent from the remote control 10 to the TV 80 to tune the TV tuner to that channel, i.e., the channel that the base station 75 was tuned to just prior to the swap. The swap is now completed, as the TV would then be tuned to the channel that the base station 75 was tuned to just prior to the swap, and would therefore be displaying the program that was being displayed on the remote control's display just prior to the swap. The remote control 10, of course, would retain in its memory the channels that it commanded both the base station 75 and the TV 80 to tune to, so that the process could be repeated.

Adding a slight twist to the previous example, assume the user is viewing channel 1 on the TV display, and channel 2 on the remote control's display 15. In that situation, the TV 80 is tuned to channel 1. The base station's input signal 85 is from broadcast TV, and its tuner is set to channel 2. Now, the user wants to watch a video on the remote control's display 15. The user will send a command to the base station 75 to switch its input 85 from broadcast TV to the VCR, and a command to the VCR to begin playing. These commands could of course be sent by actuating a single button on the remote control 10. Now, if the user wants to execute a swap so that the TV 80 is displaying the video, and the remote control 10 is displaying channel 1, the following is a typical sequence of commands that would be sent. First, a command sequence is sent from the remote control 10 to the base station 75 for the base station 75 to switch its input to broadcast TV, and to tune its tuner to channel 1. The first half of the swap is complete. Next, a command is sent to the base station 75 to output from the switching and MUX box 265 the VCR signal, instead of the broadcast TV signal. Next, a command is sent to the TV to change to channel 3 (or whatever the appropriate channel is for VCR input). The second half of the swap is now complete. The TV 80 would be showing the video, and the remote control 10 would be showing channel 1. Again, the remote control 10 could be programmed such that these commands could be sent by actuating a single button on the remote control 10.

For applications where embedded data is to be separated from the signal 90 or other data 95, the remote control 10 may request that the embedded data be sent to itself while the main portion of signal 90 or data 95 is transmitted to the TV 80. For example, a broadcast TV signal 85 may contain VBI-embedded data that is related to the program being broadcast, such as biographies of the actors, information about upcoming episodes, historical facts, etc. The user could then browse the VBI-embedded data on the remote control 10 while viewing the program on the primary viewing screen of the TV 80. If the VBI-embedded data (or digitally embedded data from a digital signal) is HTML data, the remote control 10 may display options for the user to respond to program-related issues, for example by voting on what should happen to certain characters, or whether the episode was good or bad. The user could then respond by using the appropriate buttons on the remote control 10 (as indicated on the display 15), which would be programmed to send appropriate information to an associated web site. Or the embedded data may actually be a web page providing access to a web site related to the program being broadcast, in which case the remote control 10 could access the web site through the base station 75 to gain more detailed information related to the program. Of course, the embedded data does not have to be related to the broadcast program, but a likely use of the embedded data is that it would be so related. Another use for embedded data is to send lists of web sites associated with advertisements being broadcast. The user could then browse the list on the remote control's display 15 during or after the advertisements, and tag or bookmark them for later reference. There are many other uses of embedded data, and the foregoing are intended to be only illustrative, and in no way limiting of the types of data the present invention is designed to make use of.

The previous discussions have presumed for the most part that the base station 75 was physically separated from the TV 80 and from the remote control 10. It should be appreciated that in an embodiment where the base station 75 is physically integrated with the TV 80, the associated communication channel (indicated by arrow 105) would not be required. Similarly, if the base station 75 is physically integrated with the remote control 10, there is no need for the base station 75 to "send" video signals to the remote control 10, and the associated communication channels (indicated by arrows 110 and 115) would not be required. In the latter case, the RF communications hardware could then be eliminated, producing additional cost savings, size reduction, maintenance benefits, etc.

Figure 3:
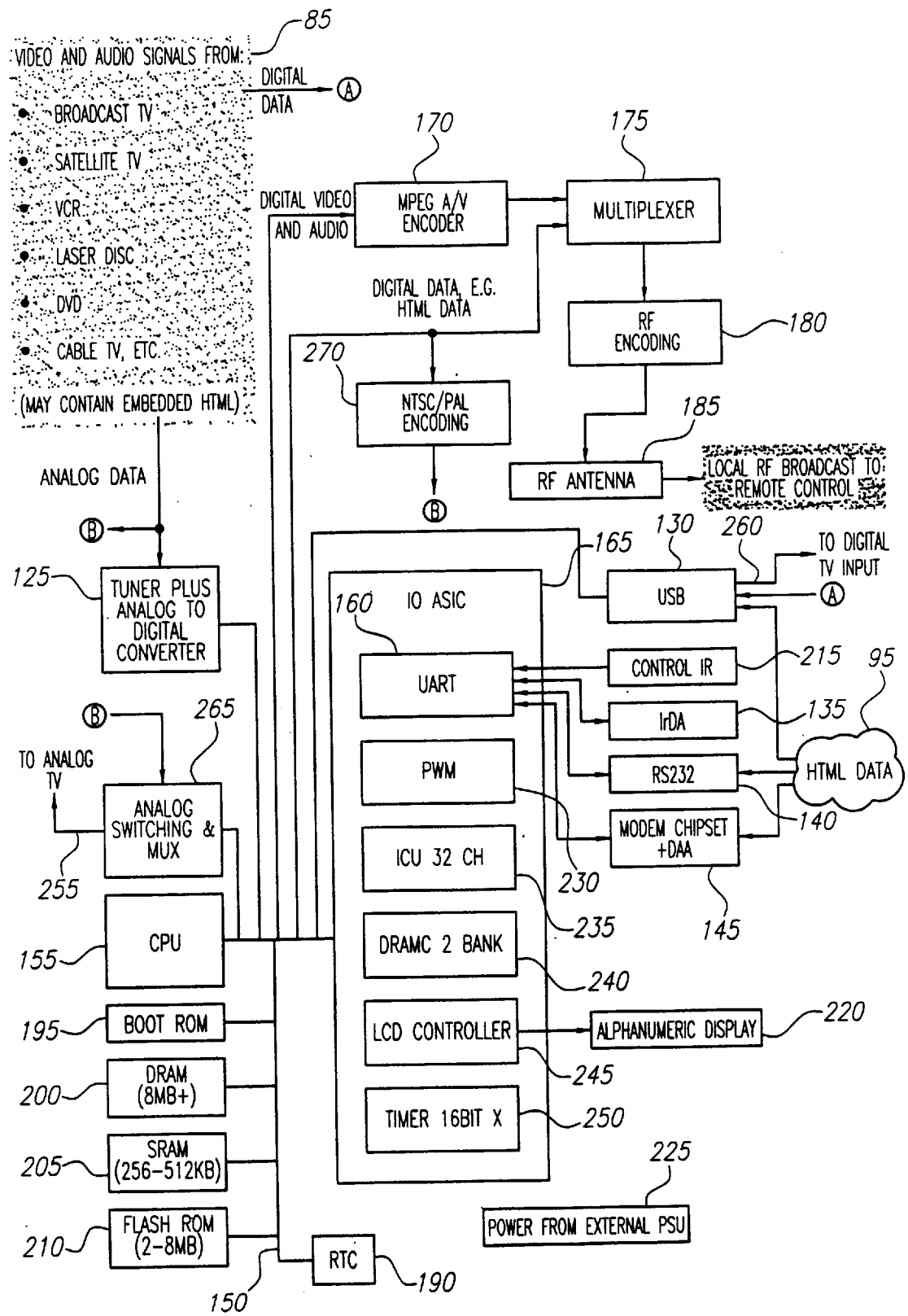
FIG. 3 is a high-level schematic of hardware used in a preferred embodiment of a base station of the present invention that is used in conjunction with a remote control of the present invention.

The hardware of a typical base station 75 will now be described, as seen in FIG. 3. The hardware is capable of receiving various data streams (signals 85 and/or other data 95), analog and/or digital, and of RF encoding the data streams and transmitting them for receipt by an RF receiver (e.g., one in the remote control 10). The hardware is also capable of processing and passing along data streams to both analog TV inputs and digital TV inputs as indicated by arrows 255 and 260 respectively.

Signals 85 may be analog or digital. Analog signals will enter the base station's "tuner+analog to digital converter"

125, and "analog switching and MUX box" 265. Digital signals enter the base station 75 through USB port 130, or through other digital inputs capable of handling higher-bandwidth data. Other data 95 (including HTML data) may enter the base station 75 through various ports 130, 140, and 145, as is described herein, and even through IrDA port 135, though that is not preferred. The incoming data 85 and/or 95 may be transferred to the data bus 150, but that is not necessary, as data passing through the switching and MUX box 265, for example, may be passed directly to an analog TV input. Also, data 95 entering through ports 130, 135, 140, and/or 145 first passes through the UART (Universal Asynchronous Receiver and Transmitter) 160 in the IO-ASIC (Input Output Application Specific Integrated Circuit) 165.

Analog data 85 to be sent to the remote control 10 passes through "tuner and analog to digital converter" 125, which converts the data to digital data and tunes to a particular channel for transmitting to the remote control 10 based on commands sent to the base station 75 from the remote control 10. The data 85 may then be processed by CPU 155, such as perhaps to strip out only embedded data to pass along to the remote control 10, or to create an alternate view of a virtual world for a video game application. Converted data 85 is sent to an MPEG A/V encoder 170, whether or not the CPU performed any processing upon it.

Digital data 85 and/or 95, or portions thereof to be sent to the remote control 10 may or may not pass through the MPEG A/V encoder 170, since data such as text will not necessarily require the MPEG compressing as video data does.

Data 85 and/or 95 or portions thereof, whether originating from analog or digital data streams, then pass through MUX 175, either directly or after passing through MPEG A/V encoder 170 as stated. All data entering MUX 175 at that point is digital data. MUX 175 combines MPEG ANV data streams with other data streams such as HTML data, then sends the combined data stream to an RF encoder 180 which passes the data through an antenna 185 so the data may be transmitted to the remote control 10. The HTML data sent to MUX 175 may be only part of the HTML data stream 85 and/or 95 originally entering the base station 75, as CPU 155 may first process data 85 and/or 95 and determine, based on requests from the remote control 10, that some of it should be passed to TV 80 instead.

Data 85 and/or 95 or portions thereof to be sent to an analog TV input are treated differently. Analog data is sent through the switching and MUX box 265 to be passed to the analog TV input, or to the analog to digital converter 125 if necessary. Switching and MUX box 265 determines which of multiple possible input signals to send to the input or inputs of an analog TV, based on commands from the remote control 10. If the analog TV has as many inputs as there are analog signals, and if the base station 75 has enough outputs connecting thereto, then the switching and MUX box 265 may send each of the analog signals to the analog TV. Before being sent to the analog TV, the analog data may undergo further processing as herein described, in which case the data typically would have to have first been converted to digital data.

Digital data 85 and/or 95 or portions thereof to be sent to an analog TV input may also be processed by CPU 155, but that is not required. And before being sent to switching and MUX box 265 for transmission to the analog TV input, the data 85 and/or 95 or portions thereof must first undergo NTSC or PAL conversion, as indicated by NTSC/PAL encoder 270.

Data 85 and/or 95 or portions thereof to be sent to a digital TV input are also treated differently. Digital data 85 and/or 95 enters through USB port 130 or other digital port, and may be processed by CPU 155 just as the other data streams. Analog data is processed if necessary, after passing through the "tuner+analog to digital converter" 125. The data and/or portions thereof are then transmitted to a digital TV input back through USB port 130 or other digital port.

Turning to other specific hardware components, the data bus 150 also connects an RTC (real-time clock) 190, memory chips 195, 200, 205, and 210, the IO-ASIC 165, and port 130, which is a USB port. The other communications ports (135, 140, 145, and control IR port 215), are connected to the IO-ASIC 165 as described herein. The base station 75 also has an alphanumeric display 220 for displaying status messages and the like. Power is supplied by an external power source 225.

The RTC 190 is preferably a crystal-based clock, and is used to synchronize IR commands with the proper TV broadcast, radio broadcast, satellite broadcast, or other signals to satisfy the consumer's requests. In addition, the RTC 190 may be used to determine when a particular title or titles from a CD have completed based on the play-time associated with the title or titles.

Memory 195 is a boot ROM for holding the system software, and memory 210 is a flash ROM for storing downloaded information such as IR command libraries of devices being controlled, or other information such as data related to the user's CD collection. The flash ROM 210 is preferably at least 2–8 Megabytes. Memory chips 200 and 205 are RAM chips used for working memory. Memory 200 is shown as a DRAM, and is preferably at least 8 megabytes. Memory 205 is shown as an SRAM and is preferably at least 256–512 Kilobytes. The SRAM 620 may be used for certain operations such as MPEG encoding and/or decoding that require faster speed than other operations.

The IO-ASIC 165 comprises UART 160, a PWM (Pulse Width Modulator) 230, a 32TS channel ICU (Interrupt Controller Unit) 235, a 2-bank DRAMC (DRAM controller) 240, an LCD controller 245, and its own 16-bit 4-channel timer 250. The UART 160 is used to receive data through control IR port 215, and to transmit and receive data through ports 135, 140, and 145. Control IR port 215 or its equivalent is essential because the data received through control IR port 215 are the IR commands from the remote control 10. The other ports (130, 135, 140, and 145) are optional, but at least one is required in order for the base station 75 to connect to an outside data source such as the Internet. Port 135 is an IrDA (Infrared Data Association) port used for wireless communication. Port 140 is an RS232 port for connection to a standard serial port of a PC. Port 145 is a modem port for connection directly to telephone lines. Port 130 is a USB port which is an industry standard port for "plug and play" connection to PCs. The USB port 130 is connected directly to bus 150 and can transfer data at a rate of up to 4 megabytes per second, much faster than the UART 160 which can typically transfer data at a rate of only up to about 115 kilobytes per second. The ports other than the USB port 130 are connected to bus 150 only through the UART 160 in the IO-ASIC 165.

The PWM 230 may be used to activate a speaker (not shown) to alert the user of errors on input when programming, or attempted unauthorized access to certain data, or a pending request, or any other event through the use of various beeping or buzzing sounds of various frequencies, volumes, and/or durations. Voice data may also be employed where the voice data is either predetermined, or dynamically loaded into the base station 75, or dynamically created by suitable software. The ICU 235 coordinates and controls requests to the CPU 155 from various input and output devices either integrated with the base station 75 or connected thereto. The DRAMC 240 controls access to the DRAM 200, and LCD controller 245 controls what is displayed on the alphanumeric display 220. The timer 250 is used for short timing (on the order of milliseconds) within the IO-ASIC 165 (such as refreshing the alphanumeric display 220, etc.).

Figure 4:
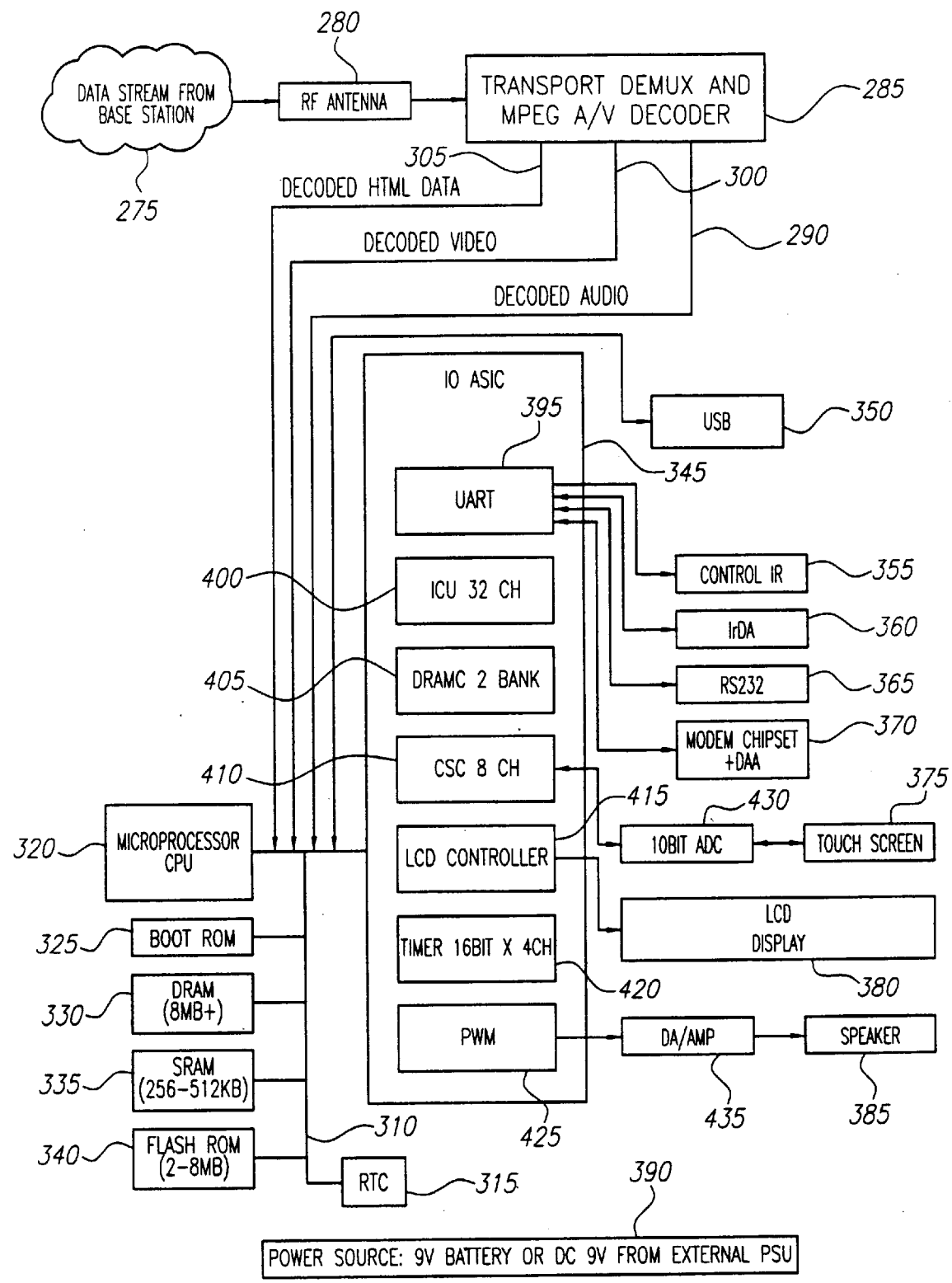
FIG. 4 is a high-level schematic of hardware used in a preferred embodiment of a remote control of the present invention.

The hardware of a typical remote control 10 will now be described, as seen in FIG. 4. The remote control 10 is capable of receiving RF data 275 through an RF antenna 280. The data 275 is transmitted from the base station's antenna 185 (FIG. 3), and, may include audio, video, and or other data such as HTML data. The data 275 passes first through a "transport Demux and MPEG ANV decoder" (Demux) 285 where any audio data 290, video data 300, and HTML or other data 305 is separated.

A data bus 310 connects an RTC (real-time clock) 315, CPU 320, memory chips 325, 330, 335, and 340, IO-ASIC 345, and USB port 350. Various other communications ports 355, 360, 365, and 370, are connected to the IO-ASIC 345 as will be described shortly. The remote control has a touch screen 375 and LCD 380, and may also have a speaker 385 for sound. The power source 390 is shown preferably as a 9V battery or 9V from an external power source.

The RTC 315 is preferably a crystal-based clock, and is used to synchronize IR commands with the proper TV broadcast, radio broadcast, satellite broadcast, or other signals to satisfy the consumer's requests. In addition, the RTC 315 is used to determine when a particular title or titles from a CD have completed based on the play-time associated with the title or titles.

Memory 325 is a boot ROM for holding the system software. Memory 340 is a flash ROM, and stores downloaded information such as TV schedules, CD track data, pre-loaded IR command libraries, etc. The flash ROM 340 is preferably at least 2–8 Megabytes. Memory chips 330 and 335 are RAM chips used for working memory. Memory 330 is shown as a DRAM, and is preferably at least 8 megabytes. Memory 335 is shown as an SRAM and is preferably at least 256–512 Kilobytes. The SRAM 335 is used for certain operations such as video encoding and/or decoding that may require faster speed than other operations.

The IO-ASIC 345 comprises a UART (Universal Asynchronous Transmitter and Receiver) 395, a 32-channel ICU (Interrupt Controller Unit) 400, a 2-bank DRAMC (DRAM controller) 405, an 8-channel CSC (Chip Select Controller) 410, an LCD controller 415, its own 16-bit 4-channel timer 420, and a PWM (Pulse Width Modulator) 425. The UART 395 is used to transmit data through port 355 which is a control IR port, and to transmit and receive data through ports 360, 365, and 370. Control IR port 355 or its equivalent is essential because the data sent through control IR port 355 are the IR commands to control devices. The other ports (320, 360, 365, and 370) are optional, but at least one is required in order for the remote control 10 to connect to an outside data source such as the Internet. Port 360 is an IrDA port used for wireless communication. Port 365 is an RS232 port for connection to a standard serial port of a PC. Port 370 is a modem port for connection directly to telephone lines. Port 350 is a USB port which is an industry standard port for "plug and play" connection to PCs. The USB port 350 is connected directly to bus 310 and can transfer data at a rate of up to 4 megabytes per second, much faster than the UART 395 which can typically transfer data at a rate of only up to about 115 kilobytes per second. The ports other than the USB port 350 are connected to bus 310 only through the UART 395 in the IO-ASIC 345.

The ICU 400 coordinates and controls requests to the CPU 320 from various input and output devices either integrated with the remote control 10 or connected thereto. The DRAMC 405 controls access to the DRAM 330, and the CSC 410 processes the consumer's touch screen 375 requests, which first pass through a 10-bit analog-to-digital converter 430. The CSC 410 also interacts with the flash ROM 340, the modem port 370, and other components, and serves a fairly general control fiction in the IO subsystem. The LCD controller 415 controls what is displayed on the LCD display 380. The timer 420 is used for short timing (on the order of milliseconds) within the IO-ASIC 345 (such as refreshing the LCD display 380). The PWM 425 sends digital signals to a digital to analog amplifier 435 which passes the signal to speaker 385. The speaker 385 may be used to alert the consumer of errors on input when programming, or attempted unauthorized access to certain data, or a pending request, or any other event through the use of various beeping or buzzing sounds of various frequencies, volumes, and/or durations. Or the speaker 385 may be used for voice sound as previously described.

While certain embodiments are illustrated in the drawings and have just been described herein, it will be apparent to those skilled in the art that many modifications can be made to the embodiments without departing from the inventive concepts described. Accordingly, the invention is not to be restricted except by the claims which follow.

What is claimed is:

1. The method comprising:
   receiving a first data stream Into a base station;
   receiving a second data stream into the base station;
   transmitting the first data stream from the base station to a first device having a display capable of displaying motion video;
   displaying the first data stream on the display of the first device;
   transmitting the second data stream from the base station to a second device having a display capable of displaying full motion video; and
   displaying the second data stream on the display of the second device, a command being sent from the second device to the base station;
   wherein the second device is a hand-held remote control.

2. The method of claim 1 wherein the second data stream is transmitted from the base station to the hand-held remote control using radio frequency transmission.

3. The method of claim 1 further comprising
   discontinuing to display the first data stream on the display of the first device, displaying the second data stream on the display of the first device, discontinuing to display the second data stream on the display of the second device, and displaying the first data stream on the display of the second device, all substantially simultaneously in response to activation of a button on the second device.

4. The method of claim 1 wherein the first and second data streams are contained within a primary data stream prior to entering the base station, and further comprising the step of processing the primary data stream within the base station to extract the first and second data streams from the primary data stream.

5. The method of claim 4 wherein the primary data stream comprises an analog signal having a vertical blanking interval with data embedded within the vertical blanking interval, and wherein the second data stream comprises data in the vertical blanking interval.

6. The method of claim 5 wherein the primary data stream comprises a TV signal.

7. The method of claim 5 wherein the data within the vertical blanking interval comprises HTML data.

8. The method of claim 4 wherein the primary data stream comprises a digital signal.

9. The method of claim 4 wherein the second device is a hand-held remote control.

10. The method of claim 4 further comprising discontinuing to display the first data stream an the display of the first device, displaying the second data stream on the display of the first device, discontinuing to display the second data stream on the display of the second device, and displaying the first data stream on the display of the second device, all substantially simultaneously in response to activation of a button on the second device.

11. The method of claim 4 wherein the primary data stream is a TV broadcast signal comprising multiple channels including a first channel and a second channel, and wherein the first data stream is associated with the first channel and the second data stream is associated with the second channel, further comprising the steps of:

tuning a tuner of the first device to the first channel; and tuning a tuner of the base station to the second channel prior to transmitting the second data stream.

12. The method of claim 11 wherein the second device is a portable hand-held device.

13. The method of claim 11 wherein the second data stream is transmitted using radio frequency transmission.

14. The method of claim 1 wherein the first data stream comprises a TV signal.

15. The method of claim 1 wherein the first data stream comprises HTML data.

16. The method of claim 1 wherein the HTML data enters the base station from the Internet.

17. A system comprising:

a first device having a display capable of displaying motion video;

a second device having a display capable of displaying motion video, and having communications hardware for sending control infrared (IR) commands, and a radio frequency (RF) receiver for receiving RF transmissions; and a base station connected to the first device via a wired connection, and having communications hardware for receiving control IR commands and for sending RF transmissions.

18. The system of claim 17 wherein the second device is a hand-held remote control.

19. The system of claim 18 wherein the remote control further comprises a communications port.

20. The system of claim 17 wherein the base station further comprises a tuner.

21. The system of claim 18 wherein the remote control comprises a tuner.

* * * * *

UNITED STATES PATENT AND TRADEMARK OFFICE
CERTIFICATE OF CORRECTION

PATENT NO. : 6,567,984 B1  Page 1 of 1
DATED : May 20, 2003
INVENTOR(S) : David E. Allport It is certified that error appears in the above-identified patent and that said Letters Patent is hereby corrected as shown below:

Title page,
Item [74], *Attorney, Agent, or Firm*, delete "Kevin" and insert therefor -- Keiji -- after ", *or Firm*—" and before "Masaki;"; and delete "Steven" and insert therefor -- Steve A. -- after "Masaki;" and before "Wong;"
Item [57], ABSTRACT,
Line 7, delete "Is" after "The second device" and before "capable of displaying motion video." and insert therefor -- is -- (the letter "i" should be lower case).

Column 16,
Line 35, delete "Into" after "receiving a first data stream" and before "a base station" and insert therefor -- into -- (the letter "i" should be lower case);

Column 17,
Line 15, delete "an" after "to display the first data stream" and before "the display of the first" and insert therefor -- on --

Signed and Sealed this

Twenty-eighth Day of October, 2003

JAMES E. ROGAN
*Director of the United States Patent and Trademark Office*